United States Patent
Gaucas et al.

(10) Patent No.: US 8,166,525 B2
(45) Date of Patent: Apr. 24, 2012

(54) DOCUMENT MANAGEMENT SYSTEM WITH PUBLIC KEY INFRASTRUCTURE

(75) Inventors: Dale Ellen Gaucas, Rochester, NY (US); Paul Ronald Austin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1630 days.

(21) Appl. No.: 11/221,529

(22) Filed: Sep. 8, 2005

(65) Prior Publication Data

US 2007/0055882 A1    Mar. 8, 2007

(51) Int. Cl.
G06F 7/04    (2006.01)

(52) U.S. Cl. ............ 726/5; 726/6; 726/10; 713/156

(58) Field of Classification Search .......... 726/5, 6, 726/10; 713/156
See application file for complete search history.

(56) References Cited

U.S. PATENT DOCUMENTS

| | | | | |
|---|---|---|---|---|
| 2002/0052950 | A1* | 5/2002 | Pillai et al. | 709/224 |
| 2002/0111921 | A1* | 8/2002 | Aupperle | 705/75 |
| 2003/0188149 | A1 | 10/2003 | Kobayashi et al. | |
| 2003/0188151 | A1 | 10/2003 | Sato et al. | |
| 2004/0267911 | A1* | 12/2004 | Alam | 709/220 |
| 2004/0268148 | A1* | 12/2004 | Karjala et al. | 713/201 |
| 2005/0288967 | A1* | 12/2005 | Zammit | 705/3 |
| 2006/0184452 | A1* | 8/2006 | Barnes et al. | 705/50 |
| 2008/0228651 | A1* | 9/2008 | Tapsell | 705/65 |

OTHER PUBLICATIONS

Security Guide: X.509 Certificate Authentication Service and Public Key Infrastructure; http://publib16.boulder.ibm.com/pseries/en-us/aixbman/security/cas_pki:htm; pp. 1-33 (before Sep. 7, 2005).
Windows Server 2003 Technical Reference>Technologies Collections>Windows Security Collection>PKI Technologies>Certificate Services Technical Reference; "What is Certificate Services?" pp. 1-6 (Mar. 28, 2003).

* cited by examiner

*Primary Examiner* — Christopher Brown
(74) *Attorney, Agent, or Firm* — Miele Law Group PC

(57) ABSTRACT

Apparatus are provided, including a document management system and a private certificate authority. The private certificate authority is private to the document management system, and includes a certificate authority public key, a certificate authority private key, a key pair generator, and a digital certificate issuer. The key pair generator generates key pairs for respective authorized users of the document management system. The digital certificate issuer issues digital certificates regarding the respective authorized users of the document management system. The private certificate authority includes software instantiated by or with the document management system.

19 Claims, 5 Drawing Sheets

DOCUMENT MANAGEMENT SYSTEM WITH PUBLIC KEY INFRASTRUCTURE

NOTICE OF COPYRIGHT

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

The present disclosure relates to document management systems.

BACKGROUND

Document Management Systems (DMSS) help businesses manage various types of media documents (audio, video, text, varying file formats), and the content of those documents. They do this by, for example, allowing users throughout the organization to readily locate and access documents and their content; maintaining and tracking versions of documents as they are modified; providing appropriate levels of access security; and/or providing ways for users to collaborate in their work and to communicate with each other—e.g., with email features. The web-based Xerox DocuShare Enterprise Content Management (ECM) solution is one example of a document management system.

Should a DMS implement a Public Key Infrastructure (PKI)—based secure interface, additional infrastructure or services will be required outside simply purchasing, installing, and managing the DMS. For example, a DMS that supports S/MIME may employ X.509 certificates which require PKI certificate authorities outside the DMS—e.g., VeriSign or enterprise services such as the Microsoft Windows Server 2003 Certificate Server.

SUMMARY

In accordance with one aspect of the present disclosure, apparatus are provided, including a document management system, and a private certificate authority. The private certificate authority is private to the document management system, and includes a certificate authority public key, a certificate authority private key, a key pair generator to generate key pairs for respective authorized users of the document management system, a digital certificate issuer to issue digital certificates regarding the respective authorized users of the document management system, and a certificate revocation mechanism to support a certificate revocation list. The private certificate authority includes software instantiated by or with the document management system.

BRIEF DESCRIPTION OF THE DRAWINGS

Embodiments are described in the detailed description which follows, by reference to the noted drawings, in which like reference numerals represent similar parts throughout the several views of the drawings, and wherein.

DETAILED DESCRIPTION

Certain terms used herein may be defined, for example, in embodiments herein, as follows. Multipurpose internet mail extensions (MIME), in embodiments herein, may refer to a system or a standard by which a message body is structured in terms of body parts, each having a content type defining its structure and type. In embodiments, secure MIME (S/MIME) may, for example, mean a specification for conveying digitally signed or encrypted information in MIME. A public key infrastructure (PKI) may, in embodiments herein, refer to a system or infrastructure needed to support public-key-based technologies used on a scale involving multiple users, or multiple systems.

A certification authority (CA), in embodiments, may mean a network entity that issues a digital certificate. In embodiments, a digital certificate is, for example, a statement to a certificate user that a particular public key is bound to a particular entity, the entity being the certificate subject. In embodiments herein, a subject or certificate subject may, for example, mean a person, device, or other entity that holds the private key corresponding to the certified public key.

In embodiments herein, a public key may, for example, be one of a pair of related keys in a public-key cryptosystem. That pair of related keys includes one key for encryption and the other for decryption. One of the keys must be held securely and is referred to as the private key. The other key may be held less securely and is referred to as the public key.

Figure 1:
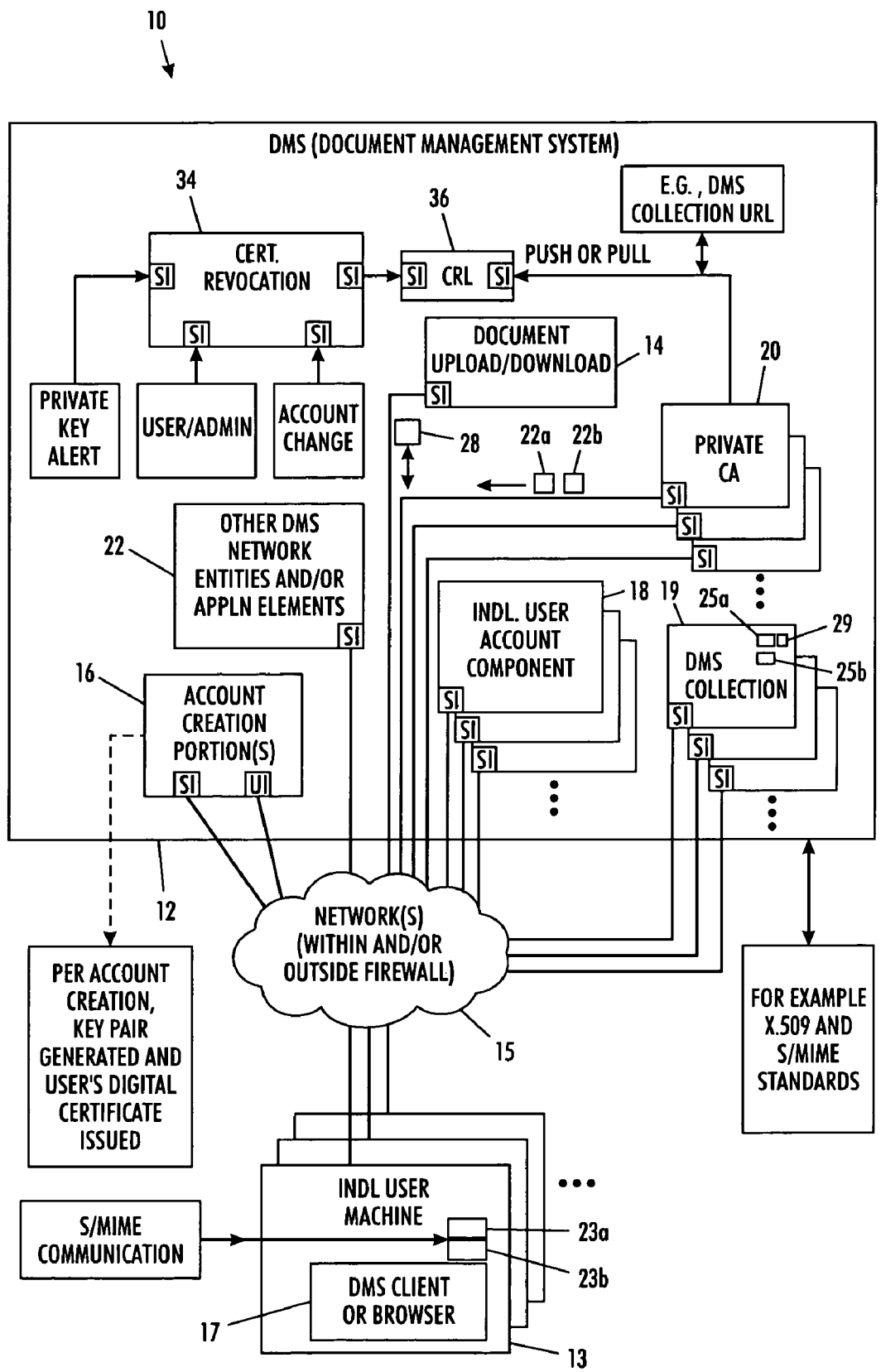
FIG. 1 is a block diagram of an enterprise system, including a document management system.

Referring now to the drawings in greater detail, FIG. 1 shows an enterprise system 10, which includes a document management system (DMS) 12 coupled to a set of individual user machines 13 via one or more networks 15. The one or more networks 15 may be within and/or outside of a firewall of the enterprise. For those portions of the network and entities connected to the network that are outside the enterprise firewall, in the illustrated embodiment, those entities communicate, generally, via a secure interface. For example, in the illustrated embodiment, many such connections in the enterprise system 10 are via, for example, X.509 and S/MIME standards.

Each individual user machine 13 includes, among other elements not specifically shown, a document management system client or browser 17, by which an individual user can interact with document management system 12.

Document management system 12 includes various document management systems network entities and/or application elements 22, which allow for document location, document access, and version tracking, among other various document management system features that may be provided by a document management system. In addition, a document upload/download mechanism 14 is provided. Document upload/download mechanism 14 may include instantiated software running on a platform, for example, implemented using features of the secure S/MIME interface document upload feature provided by DocuShare of Xerox, modified to include a secure download feature.

In addition, the illustrated document management system includes one or more account creation portions 16, which create individual user account components 18, associated with respective individual users, which can access the document management system 12 via individual user machines 13.

Each individual user account component 18 corresponds to a specific individual user having an account with document management system 12. Each such component 18 includes software of document management system 12 which facilitates communication with the corresponding DMS client or browser 17 on the individual user machine 13, as well as individual user—specific data defining or associated with each such account.

The illustrated document management system 12 further includes a set of private certificate authorities (CAs) 20, one or more DMS collections 19 (which may correspond, respectively, to the private CAs 20), a certificate revocation mechanism 34, and a certificate revocation list (CRL) 36.

Account creation portion 16 is in communication with other portions of document management system 12 and with individual user machines 13, via one or both of a secure interface (SI) and an unsecure interface (UI).

Account creation portion(s) 16, per each account creation, facilitates the generation of a key pair for the new user as well as the issuance of a user's digital certificate. More specifically, one of the private certificate authorities 20 generates a user digital certificate 22*a* and a corresponding user key pair 22*b*, which are shown in transit between private CAs 20 and either the individual user's machine 13 or a DMS collection 19. In accordance with one embodiment herein, the user's digital certificate 23*a* and corresponding key pair 23*b* may be stored on the individual user machine 13 as shown. Alternatively, in accordance with another embodiment, one or more DMS collections 19 may be provided, for securely storing the resulting user's digital certificate 25*a*, and user's key pair 25*b*. In addition, for example, the public key or keys of the one or more private CAs 29 may be stored within the DMS collection(s) 19. Access to such collections may be securely controlled, for example, via the DMS password mechanism and access control mechanism.

To facilitate the security of the data being exchanged within enterprise system 10, all portions of the network 15 as well as any network entities may be provided within a firewall of the enterprise network. For those portions that are not within the firewall, secure interfaces (SI) may be provided in association with each portion of document management system 12, and on each individual user machine 13. That secure interface may be, for example, as shown in the embodiments, via S/MIME email communication.

A certificate of a given DMS user may be revoked, for example, if there is an alert with respect to the private key of any entity in the PKI infrastructure of document management system 12, or of the enterprise system 10 more generally. In addition, a certificate may be revoked simply at the request of a user or an administrative person administrating the document management system 12. In addition, when an account change is made for a given user, the digital certificate for that corresponding user may be revoked. When a certificate is revoked, certificate revocation mechanism 34 will place that certificate on the CRL 36. That CRL information may be either pushed to or pulled by the PKI infrastructure including private CAs 20. In one embodiment, if the CRL is published outside the firewall of the enterprise, the CRL can be accessed by providing a URL CRL field in the certificate itself. This will allow an individual user machine 13 outside the firewall to access the CRL, for example when using the DMS secure email interface, to insure that the certificate has not been revoked.

As noted above, the private CAs 20 may be within the firewall of document management system 12. Generally, private CAs 20, in the embodiment shown, will use the same security interface features as other elements within document management system 12. More specifically, private CAs 20 may send and receive data via a secured internet mail interface (SI). More specifically, that secured internet mail interface may include a secure internet mail interface compliant with S/MIME standards.

The illustrated private CAs 20 each include software instantiated by or with document management system 12. More specifically, for example, each of the private CAs 20 in operation in a given enterprise system 10 may be installed (and/or instantiated) at the time of installation of document management system 12 as part of that installation. Alternatively, each private CAs 20 may be installed (and/or instantiated) subsequent to the installation of document management system 12, upon the selection of an option within the document management system 12 software to provide for one or more private CAs 20, or to provide for an additional private CA 20 for a DMS public key infrastructure (PKI).

Figure 4:
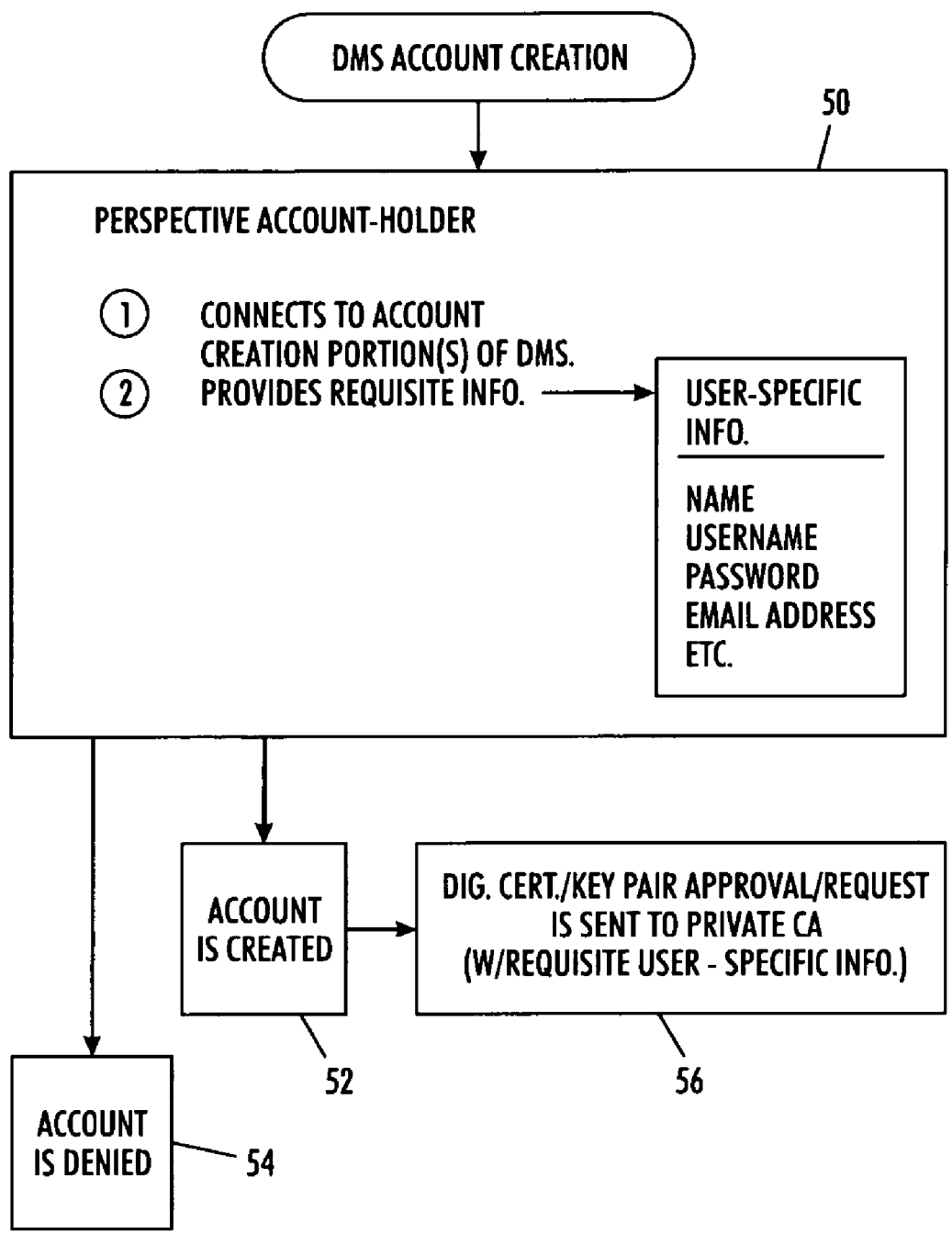
FIG. 4 is a simplified flow chart showing the creation of a document management system user account.

Account creation portion(s) 16 includes a user information input to receive user-specific information from a prospective DMS account holder. FIG. 4 is a flow chart illustrating the basic process by which a DMS user account can be created. As shown in FIG. 4, in an act 50, a prospective account holder first connects to the account creation portion(s) of the document management system, and then provides the requisite information to the account creation portion(s). This requisite information includes user-specific information. In the illustrated embodiment, that information may include the name, user name, password, email address, and so on of the DMS prospective user. After this information is input, the account creation portion(s) of DMS 12 will either create the account at act 52, or deny the account at act 54. If the account is created at act 52, subsequently at act 56, a digital certificate key pair approval or request is sent to a private CA 20. This approval or request includes sending requisite user-specific information which will be used by private CA 22 to issue certificates and to generate key pairs.

Figure 2:
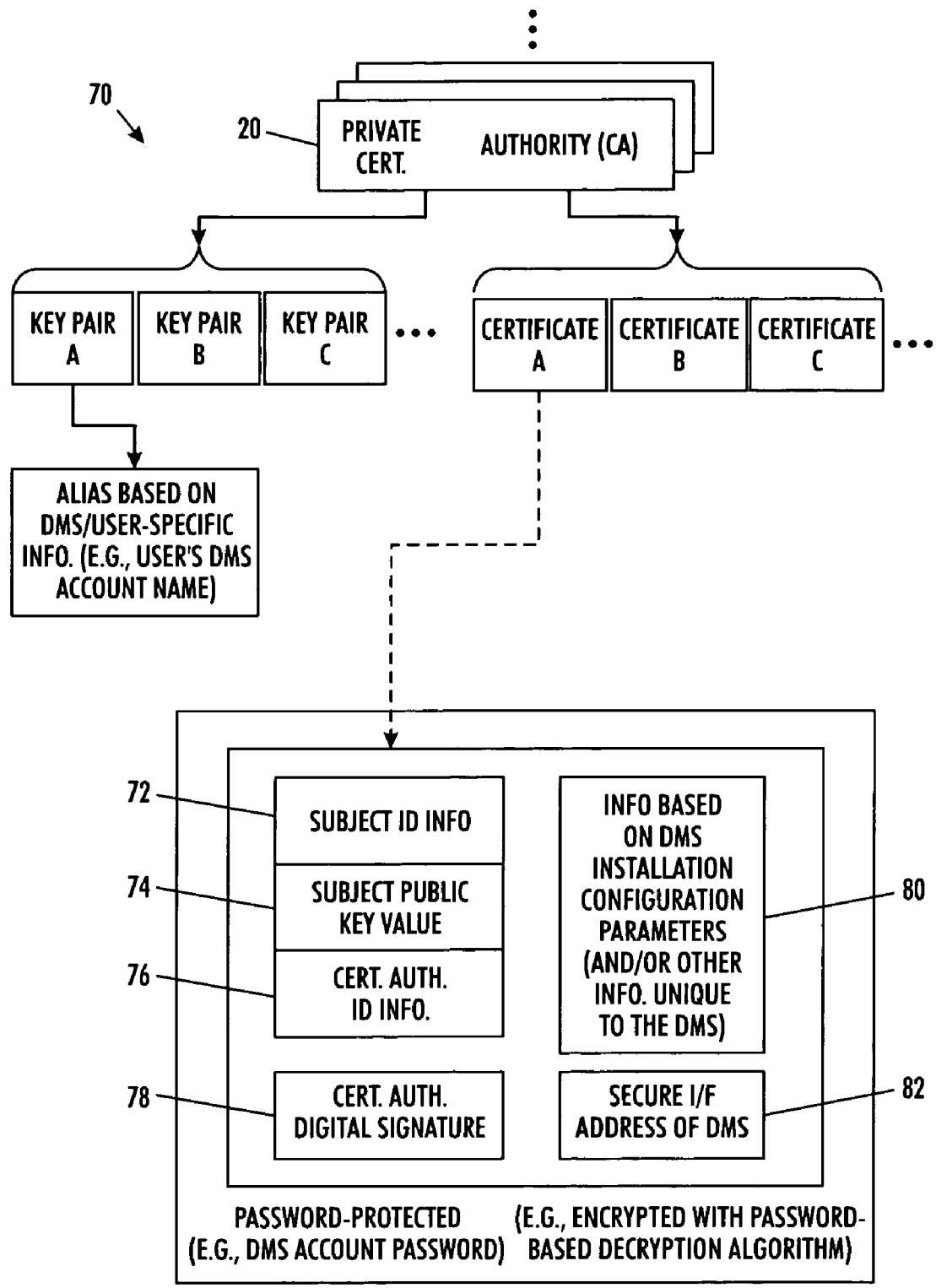
FIG. 2 is a block diagram illustrating portions of a public key certification system.

FIG. 2 is a diagram of a public key certification system 70, which is employed in the enterprise system 10 shown in FIG. 1. As shown in FIG. 2, each private CA 20 will generate respective key pairs A, B, and C for DMS users A, B, and C, and it will also issue certificates A, B, and C corresponding to those same respective DMS users. A given key pair, for example, key pair A, may be generated using user-specific information of that DMS user A. For example, the alias used to generate key pair A may be based on the user's DMS account name. Each certificate may, in the illustrated system, have a structure as shown in FIG. 2. To ensure security, each certificate along with private key may be password protected. For example, it may be encrypted with a password-based decryption algorithm, which will allow for self-decryption upon entry of a password.

The password for protecting a certificate along with private key may be the same as the DMS account password, in one embodiment.

The illustrated certificate for a DMS user A includes subject identification information 72, a subject public key value 74, and certificate authority identification information 76. In addition, a certificate authority digital signature 78, of the issuing certificate authority 20, is also provided. The illustrated certificate further includes information 80, based on the DMS installation configuration parameters. Alternatively, the illustrated certificate for DMS user A, and for any of the other users, may include other information unique to the DMS, other than the installation configuration parameters. This provides an additional level of security, facilitates the authentication of the certificates, and associates the certificates specifically with the DMS 12 of that enterprise. In addition, each certificate includes a secure interface address 82 of the DMS. In the illustrated embodiment, that secure interface address is the email address of the DMS server.

Figure 3:
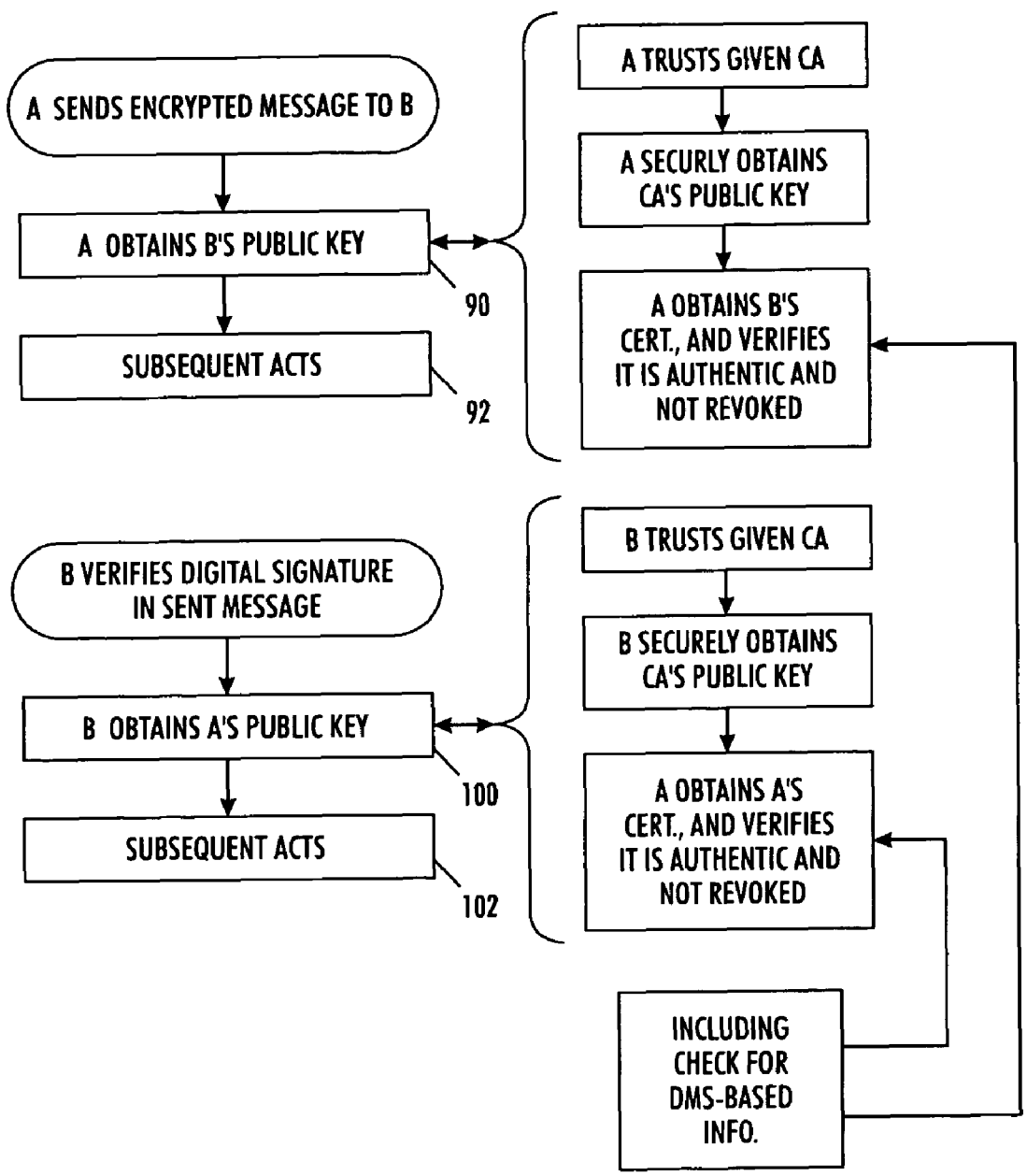
FIG. 3 includes flow charts illustrating certain acts performed when sending an encrypted message or when verifying a digital signature of a message, to insure authentication, integrity, and confidentiality.

FIG. 3 shows flow charts pertaining the authentication and confidentiality of information when one party sends an encrypted message to another, or when the receiver wishes to verify the digital signature of the sending party.

When a sender A sends an encrypted message to a receiver B, in a first act 90, A obtains B's public key. Thereafter, other acts 92 are performed to allow the encrypted message to be sent. When A obtains B's public key 90, a number of conditions are met. First, A needs to trust the given certificate authority that has issued B's public key. Then, A needs to securely obtain the CAs public key. This may be done directly, or via a public key of an affiliated CA. Finally, A obtains B's certificate, and verifies that it is authentic and not revoked. The authentic nature of B's certificate is done by verifying the CA's digital signature with respect to the CA's public key. In addition, authentication may include checking for DMS-based information. For example, a check may be performed to determine if B's certificate and the CA's digital certificate each include specific common DMS-specific information. For example, that information may include information based on DMS installation configuration parameters, as described above. Sender A may obtain the keys and certificate referred to above by using the DMS storage, access, and download mechanisms.

When a receiver B wishes to verify the digital signature of a sender A, which is sent in a message, a first act 100 is performed by which B obtains A's public key. Then, subsequent acts 102 are performed, pertaining to that verification. In act 100, B first must trust a given CA. Then, B securely obtains the CA's public key. Finally, B obtains A's certificate, and verifies that it is authentic and not revoked. The verification of authenticity may be performed in the same as that described above with respect to act 90. Receiver B may obtain the keys and certificate referred to above by using the DMS storage, access, and download mechanisms.

Figure 5:
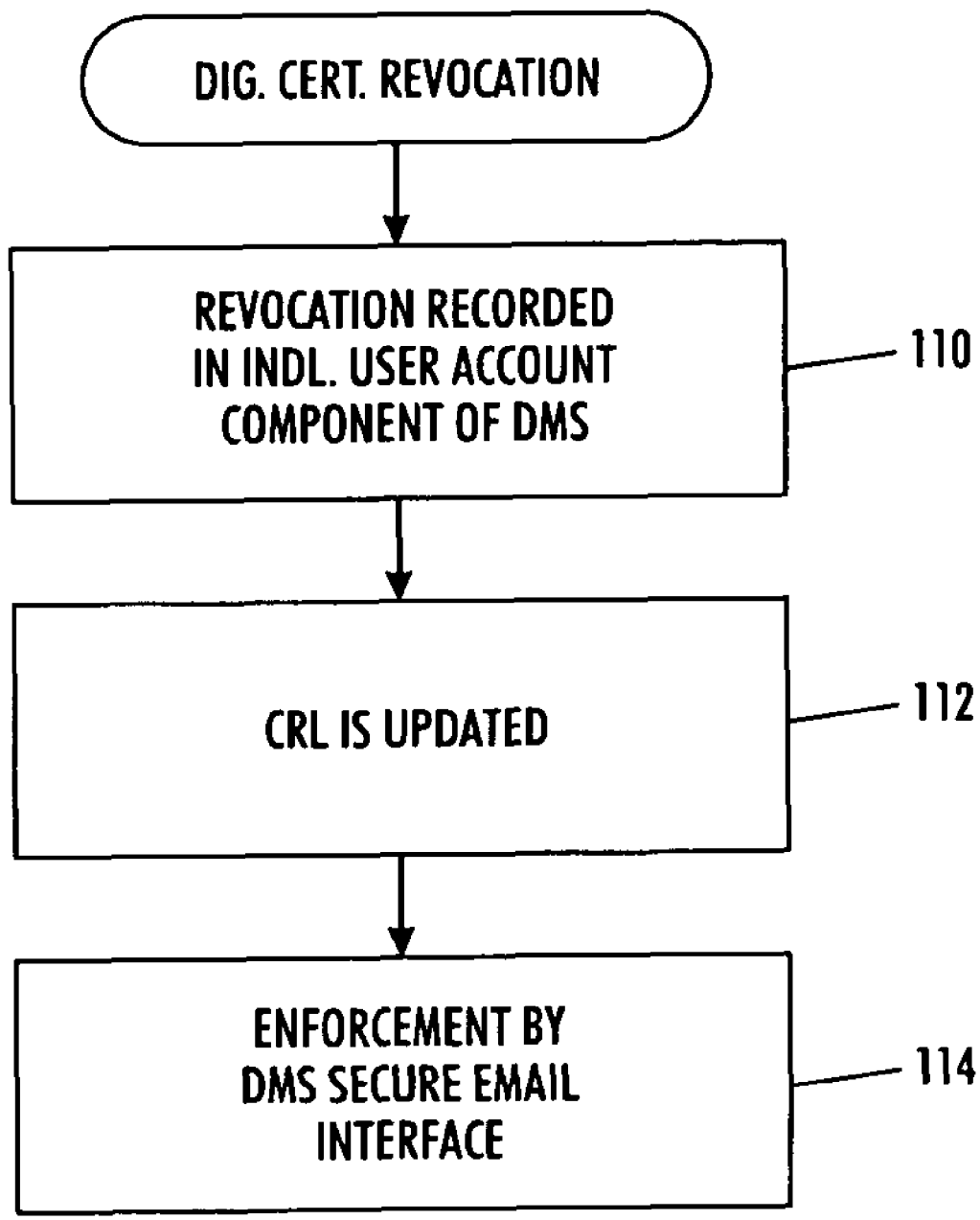
FIG. 5 is a flow chart of a digital certificate revocation process.

FIG. 5 shows a process by which a digital certificate is revoked. As shown in FIG. 5, when a digital certificate is revoked in the illustrated system, in a first act 110, the revocation is recorded in the individual user account component 18 of DMS. Then, in act 112, the CRL 36 is updated. Finally, in act 114, the revocation is enforced by the DMS secure email interface of the illustrated system. The specific acts 110, 112, and 114 shown in the flow chart of FIG. 5 need not be in that specific order.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
   a processor;
   computer-readable media;
   a document management system including a private certificate authority installation trigger configured to cause the installation of a private certificate authority upon the occurrence of a certain event;
   the private certificate authority private to the document management system, the private certificate authority including a certificate authority public key, a certificate authority private key, a key pair generator to generate key pairs for respective authorized users of the document management system, a digital certificate issuer to issue digital certificates regarding the respective authorized users of the of the document management system, and a certificate revocation mechanism to support a certificate revocation list; and
   the private certificate authority including software, the software being installed at the behest of the document management system, the software being installed at the behest of the document management system upon the certain event which is a user selecting a private certificate authority option while interfacing with the document management system.

2. The apparatus according to claim 1, wherein the private certificate authority is within a firewall of the document management system.

3. The apparatus according to claim 1, wherein the private certificate authority includes a security interface compatible with a security interface of the document management system.

4. The apparatus according to claim 3, wherein the security interface of the private certificate authority and of the document management system include a secure Internet mail interface.

5. The apparatus according to claim 4, wherein the secure internet mail interface includes an S/MIME internet mail interface.

6. The apparatus according to claim 1, wherein the private certificate authority includes software installed subsequent to an installation of the document management system.

7. The apparatus according to claim 6, wherein the document management system further includes an option that can be selected by a user to provide a private certificate authority for public key infrastructure capabilities of the document management system.

8. The apparatus according to claim 1, further comprising a document management system account creation portion of the document management system, the document management system account creation portion including a user information input, an account creator, and an account denying mechanism, the user information input receiving user-specific information from a prospective document management system account holder.

9. The apparatus according to claim 8, wherein the user-specific information includes a name, a user name, a password, and an email address.

10. The apparatus according to claim 8, further comprising a private certificate authority communication mechanism to send at least portions of the user-specific information to the private certificate authority, the private certificate authority incorporating the sent user-specific information into the issuance of the digital certificate for a given document management system account holder and the generation of a key pair for the given document management system account holder.

11. The apparatus according to 10, wherein an alias associated with the key pair for the given document management system account holder is based on the user-specific information of the given document management account holder.

12. The apparatus according to claim 10, wherein a given authorized user digital certificate issued by the private certificate authority includes a digital certificate password for access to the digital certificate, the digital certificate password being the same as a password of the given document management system account holder.

13. The apparatus according to claim 7, further comprising a private certificate authority facilitator, responsive to the creation of a document management system account for a document management system user, to allow or request a private certificate authority to generate a document management system user key pair and to issue a document management system user digital certificate.

14. Apparatus comprising:
a document management system;
a processor;
computer-readable media;
a private certificate authority private to the document management system, the private certificate authority including a certificate authority public key, certificate authority private key, a key pair generator to generate key pairs for respective authorized users of the document management system, a digital certificate issuer to issue digital certificates regarding the respective authorized users of the document management system, and a certificate revocation mechanism to support a certificate revocation list;
the private certificate authority including software installed by or with the document management system as part of the installation of the document management system;
wherein the private certificate authority includes software installed subsequent to an installation of the document management system;
wherein the document management system further includes an option that can be selected by a user to provide a private certificate authority for a public key infrastructure capabilities of the document management system;
the apparatus further comprising a private certificate authority facilitator, responsive to the creation of a document management system account for a document management system user, to allow or request a private certificate authority to generate a document management system user key pair and to issue a document management system user digital certificate; and
wherein the private certificate authority facilitator includes a mechanism to automatically cause a private certificate authority to generate a document management system user key pair and to issue a document management system digital certificate when the document management system account is created for the given document management system user.

15. A method comprising:
providing a processor and computer-readable media;
managing storage, naming, and access to documents through a document management system installed on a given computer platform, the document management system including a private certificate authority installation trigger configured to cause the installation of a private certificate authority upon the occurrence of a certain event; and
providing the private certificate authority private to the document management system, the private certificate authority including a certificate authority public key and a certificate authority private key, generating key pairs for respective authorized users of the document management system, and issuing digital certificates regarding the respective authorized users of the document management system;
the private certificate authority including software, the software being installed at the behest of the document management system, the software being installed at the behest of the document management system upon the certain event which is a user selecting a private certificate authority option while interfacing with the document management system; and
using the document management system storage, access control, and download mechanisms to maintain and issue keys and certificates.

16. The method according to claim 15, further comprising providing a document management system account creation portion of the document management system, and providing a user information input to receive user-specific information from a prospective document management system account holder.

17. The method according to claim 16, further comprising providing a private certificate authority communication mechanism to send at least portions of the user-specific information for a given document management system account holder to the private certificate authority, the private certificate authority incorporating the sent user-specific information into the issuance of a digital certificate and into the generation of a key pair for the given document management system account holder.

18. Non-transitory computer-readable media encoded with data, the data being interoperable with a machine to cause:
managing storage, naming, and access to documents through a document management system installed on a given computer platform, the document management system including a private certificate authority installation trigger configured to cause the installation of a private certificate authority upon the occurrence of a certain event; and
providing a private certificate authority private to the document management system, the private certificate authority including a certificate authority public key and certificate authority private key, generating key pairs for respective authorized users of the document management system, and issuing digital certificates regarding the respective authorized users of the document management system;
the private certificate authority including software, the software being installed at the behest of the document management system, the software being installed at the behest of the document management system upon the certain event which is a user selecting a private certificate authority option while interfacing with the document management system; and
using the document management system storage, access control, and download mechanisms to maintain and issue keys and certificates.

19. The non-transitory computer-readable media according to claim 18, further encoded with data to cause providing a private certificate authority communication mechanism to send at least portions of user-specific information for a given document management system account holder to the private certificate authority, the private certificate authority incorporating the sent user-specific information into the issuance of a digital certificate and into the generation of a key pair for the given document management system account holder.

* * * * *